3,832,329
POLYESTERS PREPARED FROM HYDROXY-
ARYLTHIO ANHYDRIDES
Emil J. Geering, Grand Island, and Norman W. Dachs,
Buffalo, N.Y., assignors to Hooker Chemical Corporation, Niagara Falls, N.Y.
No Drawing. Original application Aug. 5, 1968, Ser. No. 749,952, now abandoned. Divided and this application Feb. 16, 1971, Ser. No. 115,778
Int. Cl. C08g 17/08
U.S. Cl. 260—47 C          7 Claims

ABSTRACT OF THE DISCLOSURE

Novel compounds of the formula:

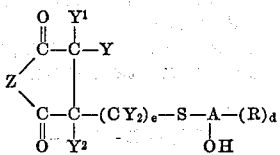

wherein $e$ is from zero to one and $d$ is from zero to about six, provided that when $e$ is zero, $Y^1$ is hydrogen; and that when $e$ is one, $Y^2$ is hydrogen; Y, $Y^1$ and $Y^2$ are of zero to about 20 carbon atoms and are independently selected from the group consisting of alkyl, aryl, alkaryl, aralkyl, hydrogen, cyano, and halogen; Z is selected from the group consisting of —NH—, —O—, —S— and —CH=CH—; A is aryl of six to 18 carbon atoms; and R is of zero to about 20 carbon atoms and is selected from the group consisting of alkyl, aryl, alkaryl, aralkyl, carbalkoxy, carbaryloxy, alkoxy, aryloxy, alkylthio, arylthio, hydroxy, mercapto, cyano, carboxy and halogen. Said compounds have utility as polymer additives. Novel polyester derivatives of the hydroxyarylthio succinic anhydride and thioanhydride compounds and a process for preparing said polyesters.

---

This is a division of application Ser. No. 749,952, filed Aug. 5, 1968 and now abandoned.

This invention relates to novel hydroxyarylthio compounds and a process for preparing said compounds by the reaction of mercaptophenols with reactive unsaturated compounds.

The addition of mercaptans to olefins is well known. This reaction is described by E. Emmet Reid in *Oragnic Chemistry of Bivalent Sulfur*, Vol. 11, Chemical Publishing Co., New York City, 1960, pp. 29-34. The reactive unsaturated starting compounds of the present invention enter into reactions with phenol. Phenyl esters are formed by acetylation of phenol with, for example, citraconic anhydride. Anhydrides such as maleic anhydride react with phenol to give malein-type products such as phenolmalein. As phenols are readily alkylated by olefins, mercaptophenol similarly could also be expected to become alkylated by olefins.

Mercaptophenol is not only a mercaptan, but it is also a phenol and, therefore, has both a reactive hydroxyl group and a reactive ring. One might expect the above alternate reactions to take precedent over the addition of the mercaptan group to an unsaturated bond. One could not predict that the compounds of this invention would be produced by the reaction of a mercaptophenol and a reactive olefin.

In accordance with the present invention, there are provided novel compounds of the formula:

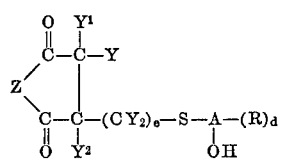

wherein:

(a) $e$ is from zero to one and $d$ is from zero to about six;

(b) provided that:
(1) when $e$ is zero, $Y^1$ is hydrogen; and
(2) when $e$ is one, $Y^2$ is hydrogen;

(c) Y, $Y^1$ and $Y^2$ are of zero to about 20 carbon atoms and are independently selected from the group consisting of alkyl, aryl, alkaryl, aralkyl, hydrogen, cyano and halogen;

(d) Z is selected from the group consisting of —NH—, —O—, —S— and —CH=CH—;

(e) A is aryl of six to 18 carbon atoms; and (f) R is of zero to about 20 carbon atoms and is selected from the group consisting of alkyl, aryl, aralkaryl, aralkyl, carbalkoxy, carbaryloxy, alkoxy, aryloxy, alkylthio, arylthio, hydroxy, mercapto, cyano, carboxy and halogen.

Also, in accordance with the present invention, there is provided a process for the preparation of the hydroxyarylthio succinic anhydride, succinimide, cyclohexenedione, and succinic thioanhydride compounds and novel polyester derivatives of the hydroxyarylthio succinic anhydride and thioanhydride compounds.

The following are typical of those compounds included within the scope of the present invention:

1-ethyl-1-(4-hydroxyphenylthio)succinimide
1-cyano-1-(2-hydroxyphenylthio)succinimide
2-(3-hydroxyphenylthio)-5-cyclohexen-1,4-dione
1-phenyl-2-(2,3-dichloro-4-hydroxyphenylthio)succinic thioanhydride
(2-hydroxyphenylthio)succinic thioanhydride
(2-hydroxyphenylthio)succinic anhydride
(2-hydroxyphenylthiomethylene)succinic anhydride
(4-hydroxyphenylthiomethylene)succinimide
5-chloro-6-(4-hydroxyphenylthio)-2-cyclohexen-1,4-dione
1-propyl-2-(2-hydroxynaphthylthio)succinic anhydride
1-dodecyl-2-(2-hydroxyphenylthio)succinic anhydride
2-(2-hydroxy-4,5,6-trimethylphenylthio)-5-cyclohexen-1,4-dione
1-benzyl-2-(3-hydroxyphenylthio)succinic thioanhydride
1-tolyl-2-(4-hydroxyphenylthio)succinimide
2-(3-hydroxyphenylmethylene)succinic thioanhydride In the compounds of the present invention the carbonyl groups are activating groups that promote the addition reaction of a mercaptophenol to an unsaturated carbon-carbon bond.

R is preferably alkyl, aryl, hydroxy, or halogen, Y, $Y^1$ and $Y^2$ are preferably hydrogen or alkyl. R, Y, $Y^1$ and $Y^2$ are preferably of zero to about ten carbon atoms.

A is preferably phenyl, and in said case, $d$ is from zero to four.

When R, Y, $Y^1$ or $Y^2$ are halo, they may be chlorine, fluorine, bromine or iodine.

The unsaturated compounds that may be used as starting materials in the preparation of the compounds of the present invention are of the following formula:

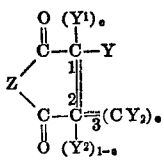

wherein subscript $e$ and Z, Y, $Y^1$ and $Y^2$ are as hereinbefore described. As indicated by the broken line, the unsaturation is at bond 1 and 2 when $e$ is equal to zero and at bond 2 and 3 when $e$ is equal to one. These compositions include compounds such as benzoquinone, maleic anhydride, itaconic anhydride, malimide and maleic thioanhydride.

The starting mercaptophenol compounds of the present invention are of the formula: HS—A(R)$_d$OH; where in A, R and $d$ are as hereinbefore described. Said compounds may be prepared by methods known in the prior art or by the procedure described in copending application Ser. No. 597,228, filed Nov. 28, 1966, now abandoned and refiled as Ser. No. 666,915, filed Sept. 11, 1967, now U.S. 3,468,961. Mercaptophenols, such as o-mercaptophenol, p-mercaptophenol, 3,5-dimethyl - 2-mercaptophenol, 4-phenyl-2-mercaptophenol, 3-cyano-2-mercaptophenol and 4-carboxy-3-mercaptophenol, are typical starting compounds.

The following reaction illustrates the process for the preparation of the novel compounds of the present invention.

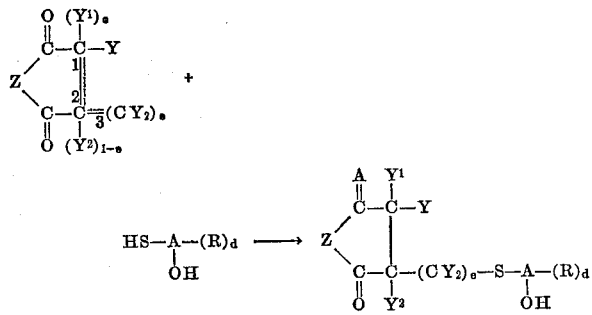

Subscripts $d$ and $e$, and Z, A, R, Y, $Y^1$ and $Y^2$ are as hereinbefore described.

Although the reaction may be conducted in the absence of a solvent, it is normally conducted in the presence of a solvent. Typical solvents include benzene, toluene, xylene, heptane, hexane, chloroform, carbon tetrachloride, chlorobenzene, dioxane, N,N-dimethylformamide, N-methyl-2-pyrrolidone, tetrahydrofuran and dimethylsulfoxide.

Although the reaction may be conducted at a temperature of about zero to about 200 degrees centigrade, the preferred temperature is from about 10 to about 150 degrees centigrade.

Although the reaction may be conducted in the absence of a catalyst, the time and temperature required to complete the reaction may generally be reduced by using a basic catalyst. A catalytic amount of about .05 mole of catalyst per mole of mercaptophenol is preferably employed. Suitable catalysts include salts of strong bases and alcohols or weak acids, amines, quaternary amine bases and alkali or alkaline earth metals or hydroxides. Examples of catalysts are sodium methylate, sodium acetate, potassium carbonate, triethyl amine, piperidine, triethylene diamine, trimethylbenzylammonium hydroxide and sodium or magnesium and sodium hydroxide.

The hydroxyarylthio succinic anhydrides and thioanhydrides of the present invention can be reacted with glycols or thioglycols to give the novel polyesters of the present invention.

Said novel polyesters contain at least one unit of the formula

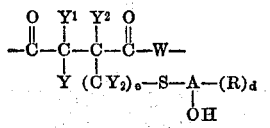

Y, $Y^1$, $Y^2$, A, R and subscripts $d$ and $e$ are as hereinbefore described.

The preferred polyesters of the present invention are of the formula

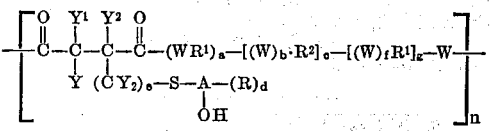

$R^1$ is alkylene of one to about five carbon atoms; $R^2$ is alkylene of one to about five carbon atoms or phenylene, and W is oxygen or sulfur. Subscript $a$ is from one to about 100; $b$ is zero or one; $c$ is from zero to about 100; $f$ is zero or one; $g$ is zero or one, provided that when $g$ is one, $c$ is greater than zero.

The even more preferred polyester compositions of the present invention contain at least one unit of the formula

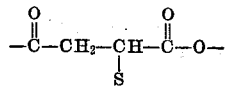

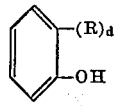

R and subscript $d$ are as hereinbefore described.

Typical glycols or thioglycols that may be used as starting compounds in the preparation of the polyesters of the present invention are as follows: diethylene glycol, ethylene glycol, α,ω-dihydroxy[poly(ethyleneoxides)], 1, 2-propylene glycol, 3,4-pentanediol, 1,10-decanediol, neopentyldiol, 1,4-cyclohexanediol, diethanol sulfide, 1,4-diethanolbenzene, 1,4-xylylenol, 1,4,5,6,7,7-hexachloro-2,3-bis(hydroxymethyl)bicyclo-(2.2.1)-heptene-5, ethylenedithiol, hexamethylenedithiol, α,ω-dimercapto(poly(ethylene sulfide)), 1,4-bis(mercaptomethyl)cyclohexane, 1,12-dodecanedithiol and bis(mercaptoethyl)sulfide. Also, glycols and dithiols prepared by the oxyalkylation or thioalkylation of the above compounds and compounds such as 4,4'-isopropylidene diphenol, resorcinol, thiobisphenol, 4,4'-dihydroxydiphenyl, aniline and methylamine.

In the process for the preparation of the novel hydroxyarylthio polyesters of the present invention, the glycol or thioglycol is reacted with the hydroxyarylthio succinic anhydride, or the corresponding dialkyl succinate, when a transesterification procedure is used, at a temperature of about 75 to about 250 degrees centigrade, for a period of about 3 to about 50 hours. No catalyst is required when the polyesterification is conducted by reaction of the hydroxyarylthiosuccinic anhydride. When a transesterification procedure is used useful catalysts are paratoluenesulfonic acid, or weakly acidic or basic catalysts such as calcium acetate or antimony trioxide.

Standard polyesterification procedures are applicable. For example, the rate of esterification can be increased by hastening the elimination of the condensation products, water or alcohol. Typically this is accomplished by passing an inert gas stream through the reaction mixture or by maintaining the mixture under reduced pressure. Water can also be removed as it forms by conducting the esterification in a water-imiscible solvent, such as toluene, whereby the water is distilled off as a component of an azeotropic distillate. The reaction is followed by periodically determining the carboxylic acid concentration or by monitoring the water or alcohol produced during the course of the reaction.

The carboxylic reagent need not be a single compound, but can be composed of several carboxylic compounds, of which one, several, or all can be hydroxyarylthio-substituted. Also the second reactant can be a mixture of several glycols or dimercaptans. Typical non-phenolic carboxylic reagents are fumaric acid, maleic anhydride, phthalic anhydride, pyromellitic anhydride, diethyl fumarate, dimethyl terephthalate, dimethyl 1,4,5,6,7,7-hexachlorobicyclo-(2.2.1)-5-heptane-2,3-dicarboxylate.

A portion of the glycol or thioglycol can be replaced by tri- or higher substituted polyols or polythiols to give a cross-linked polymer. Typical polyols are 1,1,1-trimethylolpropane, glycerol, pentaerythritol, and oxyalkylated derivatives derived from sorbitol, sucrose and phenylenediamine.

A portion of the carboxylic reagent can be replaced with unsaturated anhydride or ester, such as those mentioned above, for example, maleic anhydride. The resulting polyester can be crosslinked via these unsaturated bonds with a vinyl monomer such as styrene.

The phenolic polyester compositions of this invention can be converted to epoxy derivatives by reaction with, for example, epichlorohydrin.

The phenolic polyester compositions of this invention can be converted to a polyester substituted with aliphatic hydroxyl groups by treatment with an alkylene oxide, (oxyalkylation), such as ethylene oxide or propylene oxide. These ester polyols are useful as reagents for preparing polyurethane polymers by reaction with diisocyanates or polyisocyanates. Typical isocyanates are toluene diisocyanates and the phosgenated reaction products of formaldehyde and aniline.

The hydroxyarylthiosuccinic anhydrides, succinimides and succinicthioanhydrides of the present invention are useful when incorporated chemically into condensation polymers as stabilizers or as providers of hydroxy groups. The hydroxyl groups are used to chemically attach polymer modifiers, such as dyes, antistatic agents, hydrophobic or hydrophilic groups, and the like.

The polyesters of the present invention contain a reactive phenolic ring and hydroxy group and is therefore curable. Curing agents are carbonyl compounds, resoles, hexamethylenetetramine, polyisocyanates, diacid chlorides, diesters and the like. Reaction of the anhydride compositions of the present invention with carbonyl compounds, e.g., formaldehyde or acetone, under acid conditions with or without additional phenol present, gives carboxylic substituted bisphenol or novolak materials which may be esterified with long-chain alcohols to give reagents useful for imparting chemically-bound plasticization to polymers, or which may be incorporated into polycarbonates, for example, to serve as cross-linking sites. Furthermore, reaction of the compounds of the present invention with carbonyl compounds under alkaline conditions gives methylol or resole type materials that will cure on heating.

The following examples will further illustrate specific embodiments of this invention. It should be understood however that these examples are given by way of illustration and not limitation. All temperatures are in degrees centigrade and all parts are by weight, unless otherwise indicated.

EXAMPLE 1

To a stirred solution of 980 parts of maleic anhydride (10.1 moles), 1 part of triethylenediamine and 5600 parts toluene, was added 1260 parts of o-mercaptophenol (10.0 moles) over about a 15 minute period. The reaction was exothermic. After about one-half hour the reaction mixture was cooled to five degrees centigrade. From a resulting thick slurry, 1900 parts of product were obtained on filtration. Concentration of the filtrate and further filtration resulted in more product. The combined product was recrystallized from toluene in fractions. The first crop, about 2040 parts, represented a 91 percent yield and melted in the range of 125–130 degrees centigrade. The total weight of all crystallization fractions corresponded to a yield of 98.5 percent. The product was identified as 1-(2-hydroxyphenylthio)succinic anhydride.

*Analysis—*

Calculated for $C_{10}H_8S$:

|  | Percent |
|---|---|
| Phenolic hydroxyl | 4.47 |
| Acid and anhydride | 8.90 |
| Anhydride | 8.90 |

Found:

| Phenolic hydroxyl | 4.40 |
|---|---|
| Acid and anhydride | 8.80 |
| Anhydride | 8.74 |

EXAMPLE 2

In a manner similar to Example 1, 5 parts of benzoquinone were reacted with 11.6 parts of o-mercaptophenol. About 7.4 parts of product were obtained. The product, having a melting point of 121–122 degrees centigrade, was identified as 5-(2-hydroxyphenylthio)-2-cyclohexen-1,4-dione.

*Analysis—*

Calculated for $C_{12}H_{10}O_3S$: C, 61.52 percent; H, 4.30 percent; S, 13.69 percent; OH, 7.24 percent.

Found: C, 61.43 percent; H. 4.34 percent; S, 13.4 percent; OH, 7.38 percent.

EXAMPLE 3

In a manner similar to Example 1, 2,4-di-t-butyl-6-mercaptophenol was reacted with maleic anhydride. The product, having a melting point of 137–139 degrees centigrade, was identified as 1-(2-hydroxy-3,5-di-t-butylphenylthio) succinic anhydride.

*Analysis—*

Calculated for $C_{18}H_{24}O_4S$: C, 53.56 percent; H, 3.60 percent; S, 14.30 percent; OH, 7.57 percent.

Found: C, 53.55 percent; H, 3.44 percent; S, 14.2 percent; OH, 7.45 percent.

EXAMPLE 4

To a solution of about 25 parts of tetrahydrofuran and 9.7 parts of maleimide, were added 12.6 parts of o-mercaptophenol during a 12 minute period. The reaction mixture was maintained below about 50 degrees centigrade during the addtion by means of an ice bath. After the reaction mixture had stood for several days, the tetrahydrofuran was stripped under reduced pressure. The residue was crystallized from benzene to give 14.7 parts of product. The product, identified as (2-hydroxyphenylthio) succinimide, had a melting point of 112.0–114.5 degrees centigrade.

*Analysis—*

Calculated for $C_{10}H_{25}O_3NS$: S, 14.3 percent; OH, 4.48 percent.

Found: S, 14.02 percent; OH, 4.4 percent.

In a similar manner and in separate experiments, ethylmaleic thioanhydride and 1-ethyl-2-methylenemaleic anhydride are reacted with 3,5-dimethyl-2-mercaptophenol to yield the following respective products: 1-ethyl-2-(2-hydroxy-4,6-dimethylphenylthio) succinic thioanhydride and 1 - ethyl-2-(2-hydroxy-4,6-dimethylphenylthiomethylene) succinic anhydride.

EXAMPLE 5

To 58.3 parts of diethylene glycol were added 112 parts (0.5 moles) of (2-hydroxyphenylthio) succinic anhydride. The mixture was warmed to a temperature of 85 degrees centigrade at which temperature the anhydride went into solution. The solution was heated to 180 degrees centigrade for 75 minutes during which period 6 parts of water were distilled off. The system was put under 175 millimeters of reduced pressure and the heating continued for one hour at 190 degrees centigrade and for three hours at 170 degrees centigrade. The resulting product was a golden yellow resin.

*Analysis—*

| | Milligrams per gram |
|---|---|
| Acid value | 0.07 |
| Calculated phenolic hydroxyl value | 3.19 |
| Found | 3.20 |

In a similar manner, (2-hydroxyphenylthio)succinic anhydride is reacted with ethylenedithiol to form a polyester.

EXAMPLE 6

A low molecular weight resole was prepared by a phenol, formaldehyde and sodium hydroxide condensation reaction. Equal amounts of said resole and the polyester of Example 5 were stored at 85 to 95 degrees centigrade for three days. The product was a golden yellow hard resin. When the resole is subjected to the same conditions, it becomes a deep red resin.

EXAMPLE 7

A stirred mixture of 112 parts (0.5 mole) of 2-hydroxyphenylthio)succinic anhydride and 33.2 parts (0.55 mole) of ethylene glycol were heated to 180 degrees centigrade. The mixture was held at 180 degrees centigrade for a period of four hours and during which time a gentle sweep of nitrogen is passed through the mixture. During the last two hours of said four hour period, the system was kept under a reduced pressure of 60 mm. The product was a pale yellow, clear resin.

*Analysis—*

| | Milliequivalents per gram |
|---|---|
| Calculated hydroxy value | 3.75 |
| Found—hydroxy value | 3.81 |

Molecular weight: 847

While there have been described various embodiments of the present invention, the methods and compositions described are not intended to be understood as limiting the scope of the invention as it is realized that changes therein are possible.

What is claimed is:

1. A polyester comprising at least one unit of the formula $$-\overset{O}{\overset{\|}{C}}-\overset{Y^1}{\underset{Y}{C}}-\overset{Y^2}{\underset{(CH_2)_e-S-A-(R)_d}{C}}-\overset{O}{\overset{\|}{C}}-W-$$
$$\underset{OH}{|}$$

wherein:

(a) $e$ is from zero to one and $d$ is from zero to about six;
(b) provided that:
 (1) when $e$ is zero, $Y^1$ is hydrogen; and
 (2) when $e$ is one, $Y^2$ is hydrogen;
(c) Y, $Y^1$ and $Y^2$ are of zero to about 20 carbon atoms and are independently selected from the group consisting of alkyl, aryl, alkaryl, aralkyl, hydrogen, cyano and halogen;
(d) ω is selected from the group consisting of —O— and —S—;
(e) A is aryl of six to 18 carbon atoms; and
(f) R is of zero to about 20 carbon atoms and is selected from the group consisting of alkyl, aryl, alkaryl, aralkyl, alkoxy, aryloxy, alkylthio, arylthio, hydroxy, mercapto, cyano, carboxy and halogen.

2. A process for preparing the polyester of Claim 1, comprising reacting a compound of the formula $$Z\diagdown\overset{\overset{O}{\|}\overset{Y^1}{|}}{\underset{\underset{O}{\|}\underset{Y^2}{|}}{\overset{C-C-Y}{\underset{C-C-(CY_2)_e-S-A-(R)_d}{}}}}$$
$$\underset{OH}{|}$$

wherein:

(a) $e$ is from zero to one and $d$ is from zero to about six;
(b) provided that:
 (1) when $e$ is zero, $Y^1$ is hydrogen; and
 (2) when $e$ is one, $Y^2$ is hydrogen;
(c) Y, $Y^1$ and $Y^2$ are of zero to about 20 carbon atoms and are independently selected from the group consisting of alkyl, aryl, alkaryl, aralkyl, hydrogen, cyano and halogen;
(d) Z is selected from the group consisting of —O— and —S—;
(e) A is aryl of six to 18 carbon atoms; and
(f) R is of zero to about 20 carbon atoms and is selected from the group consisting of alkyl, aryl, alkaryl, aralkyl, alkoxy, aryloxy, alkylthio, arylthio, hydroxy, mercapto, cyano, carboxy and halo with a glycol or thioglycol at a temperature of about 75 degrees centigrade to about 250 degrees centigrade.

3. A polyester according to the process of Claim 2 of the formula:

$$\left[-\overset{O}{\overset{\|}{C}}-\overset{Y^1}{\underset{Y}{C}}-\overset{Y^2}{\underset{(CY_2)_e-S-A-(R)_d}{C}}-\overset{O}{\overset{\|}{C}}-(WR^1)_a-\left[(W)_b\cdot R^2\right]_c-\left[(W)_f R^1\right]_g-W-\right]_n$$
$$\underset{OH}{|}$$

wherein $R^1$ is alkylene of one to about five carbon atoms; $R^2$ is selected from the group consisting of alkylene of one to about five carbon atoms and phenylene; W is selected from the group consisting of oxygen or sulfur; $a$ is from one to about 100; $b$ is zero or one; $c$ is from zero to about 100; $f$ is zero or one; $g$ is zero or one, provided that when $g$ is one, $c$ is greater than zero.

4. A polyester containing at least one unit of the formula:

$$-\overset{O}{\overset{\|}{C}}-CH_2-\overset{}{\underset{S}{C}H}-\overset{O}{\overset{\|}{C}}-O-$$

with a phenyl ring bearing $(R)_d$ substituents and OH.

wherein R is selected from the group consisting of alkyl, aryl, hydroxy and halogen and $d$ is from zero to six.

5. The polyester of Claim 4 wherein $d$ is 0.

6. A polyester of Claim 1 wherein:

(a) $e$ is from zero to one and $d$ is from zero to about six;
(b) provided that:
 (1) when $e$ is zero, $Y^1$ is hydrogen; and
 (2) when $e$ is one, $Y^2$ is hydrogen;
(c) Y, $Y^1$ and $Y^2$ are of zero to about 20 carbon atoms and are independently selected from the group consisting of alkyl, aryl, alkaryl, aralkyl, hydrogen, cyano and halogen;
(d) ω is —O—;
(e) A is aryl of six to 18 carbon atoms; and
(f) R is of zero to about 20 carbon atoms and is selected from the group consisting of alkyl, aryl, alkaryl, aralkyl, alkoxy, aryloxy, alkylthio, arylthio, hydroxy, mercapto, carboxy and halogen.

7. A process for preparing the polyester of Claim 6, comprising reacting a compound of the formula

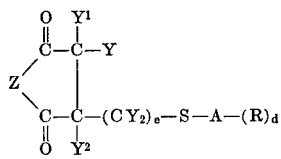

wherein:
(a) $e$ is from zero to one and $d$ is from zero to about six;
(b) provided that:
   (1) when $e$ is zero, $Y^1$ is hydrogen; and
   (2) when $e$ is one, $Y^2$ is hydrogen;
(c) Y, $Y^1$ and $Y^2$ are of zero to about 20 carbon atoms and are independently selected from the group consisting of alkyl, aryl, alkaryl, aralkyl, hydrogen, cyano and halogen;
(d) Z is —O—;
(e) A is aryl of six to 18 carbon atoms; and
(f) R is of zero to about 20 carbon atoms and is selected from the group consisting of alkyl, aryl, alkaryl, aralkyl, alkoxy, aryloxy, alkylthio, arylthio, hydroxy, mercapto, carboxy and halo with a glycol or thioglycol.

References Cited
UNITED STATES PATENTS

| | | | |
|---|---|---|---|
| 3,210,376 | 10/1965 | Smith | 260—343.6 |
| 3,472,879 | 10/1969 | Isard et al. | 260—346.2 |
| 3,664,986 | 5/1972 | MacDonald | 260—78 R |

LESTER L. LEE, Primary Examiner

U.S. Cl. X.R.

260—47 R, 50, 53 R, 75 NK, 470

PO-1050
(5/69)

UNITED STATES PATENT OFFICE
CERTIFICATE OF CORRECTION

Patent No. 3,832,329  Dated August 27, 1974

Inventor(s) Emil J. Geering and Norman W. Dachs

It is certified that error appears in the above-identified patent and that said Letters Patent are hereby corrected as shown below:

Column 1, line 53, "Oragnic" should read --Organic--.
Column 3, lines 70-71, "magnesium and" should read --magnesium metal and--.
Column 9, line 7, that part of the formula reading "$-S-A-(R)_d$" should read
$$-S-A(R)_d\!\!\!\!\!\!\!\!\!\!\phantom{-S-}\underset{\underset{OH}{|}}{\phantom{A}}$$

Signed and sealed this 21st day of January 1975.

(SEAL)
Attest:

McCOY M. GIBSON JR.
Attesting Officer

C. MARSHALL DANN
Commissioner of Patents